June 6, 1961
J. L. WEININGER ET AL
2,987,568
CELLS AND BATTERIES
Filed Sept. 27, 1957
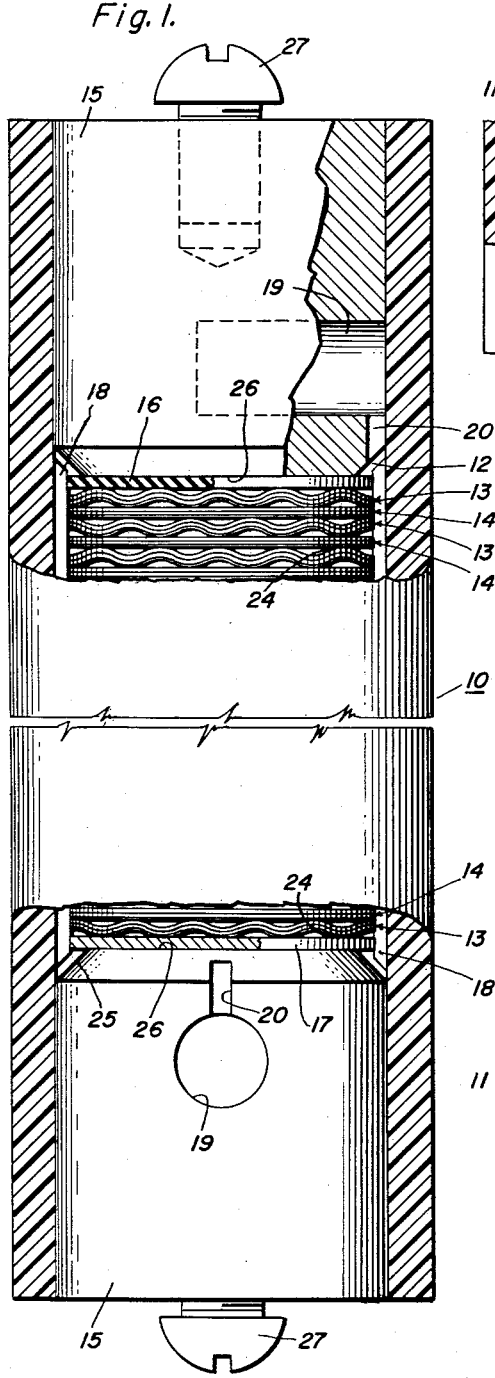
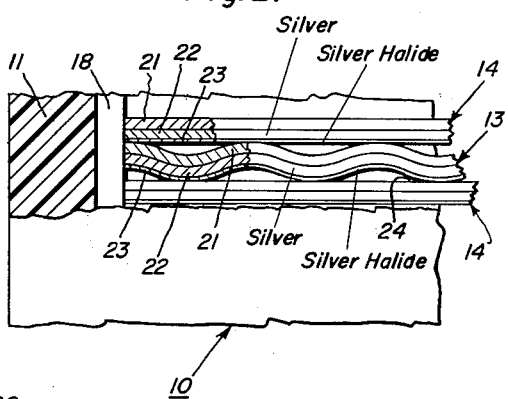
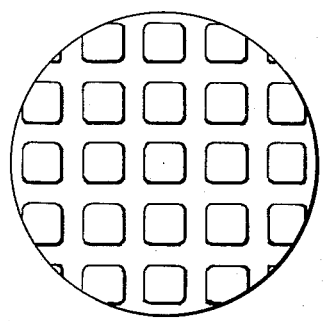
Inventors:
Joseph L. Weininger;
Herman A. Liebhafsky,
by Paul A. Frank
Their Attorney.

United States Patent Office 2,987,568
Patented June 6, 1961

2,987,568
CELLS AND BATTERIES
Joseph L. Weininger, Scotia, and Herman A. Liebhafsky, Schenectady, N.Y., assignors to General Electric Company, a corporation of New York
Filed Sept. 27, 1957, Ser. No. 686,659
11 Claims. (Cl. 136—87)

This invention relates to cells and batteries and specifically to cells and batteries employing solid electrolytes.

Batteries which contain solids electrolytes are desirable as low current power sources for electrical devices, such as transistors, radiation meters, amplifiers, image tubes, exposure meters, and for the charging of capacitors. Although a number of solids state cells and batteries are known in the art, these prior art devices fall short of the desired voltages per unit length of battery and are also fairly complicated in structure.

Accordingly, it is an object of our invention to provide an improved battery with a solid electrolyte.

It is another object of our invention to provide a solid electrolyte battery having a high voltage per unit length.

It is a further object of the invention to provide a solid electrolyte battery of simple construction so as to facilitate fabrication of the battery.

In carrying out our invention we provide a battery adapted to operate in a halogen atmosphere in which each unit cell of the battery comprises a unitary assembly of silver and an inert metal with a superimposed layer of silver halide on the silver.

These and other objects, features, and advantages of our invention will be better understood from the following description taken in connection with the accompanying drawing in which:

FIG. 1 is an enlarged view, partly in section, of a multiple cell battery which embodies our invention;

FIG. 2 is an enlarged, sectional view of a portion of the battery shown in FIG. 1 and FIG. 3 is an enlarged view of a modified unit cell of the present invention.

In FIG. 1 of the drawing a multiple cell battery which is indicated generally at 10 comprises a casing 11 which defines a chamber 12 in which a plurality of individual solid cells 13 and 14 are stacked between opposed terminal electrodes 15. The casing 11 may be composed of any suitable insulating material such as plastic, glass, or ceramics. A conductive rubber cushion 16 may be placed between the stacked cells 13 and 14 and one of the terminal electrodes 15. A conducting metal disk 17, formed of a metal inert to halogen vapors is positioned between the stacked cells 13 and 14 and the other electrode. To provide for the positioning of stacked cells 13 and 14 in casing 11, a plurality of ribs 18 extend in a longitudinal direction within casing 11 and are of such size to prevent any substantial lateral movement of stacked cells 13 and 14.

As previously mentioned, the batteries of the present invention are adapted to operate in an atmosphere of elemental halogen. To provide a reservoir for the halogen, conduits 19 are provided in terminals 15. Each of conduits 19 communicates with chamber 12 through grooves 20 provided in terminals 15.

As best shown in FIG. 2, each of the unit cells 13 and 14 of the present invention comprises a layer 21 of inert metal, a layer 22 of silver and a layer 23 of silver halide. In particular, layers 21 and 22 comprise a bimetal strip with layer 21 formed of a metal which is inert to the particular halogen in the cell under the conditions at which the cell is operated. The halide layer 23 is formed directly on the surface of the silver portion 22 of the bimetal strip.

As shown in FIGS. 1 and 2, unit cells 13 have different surface configurations from unit cells 14. These different surface configurations are desirable because of the particular reaction involved in the cells of the present invention. In these cells the halogen atmosphere in which the cell operates serves as a gaseous electrode. In these cells the cathode reaction may be defined chemically as follows:

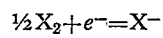

where X indicates halogen and $e$ is an electron. The half cell reaction at the silver anode of the cells of the present invention is as follows:

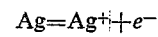

The overall reaction in the cells of the present invention is therefore as follows:

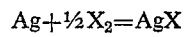

As is seen from the above reaction, inert metal layer 21 plays no part in the cell reaction and is merely an inert electrode at which the cathode reaction takes place. In order for the cathode reaction to take place, it is necessary to provide interfaces between the halogen gas of the atmosphere, the silver halide electrolyte 23 and the inert metal layer 21. By providing different surface configurations of cells 13 and 14, a number of points of contact between cells 13 and 14 are provided and halogen gas which diffuses to these points of contact because of the difference in surface configuration of adjacent cells is able to provide the cathode reaction. In FIGS. 1 and 2, cells 13 are shown as having a corrugated surface, while cells 14 are shown with a plane surface. The contact of cells 13 with cells 14 at points such as points 24 provides the loci for the cathode reaction.

It should be understood that the specific surface structure of cells 13 and 14 is not restricted to the particular form shown in FIGS. 1 and 2 since almost any irregular configuration of cells 13 or of both cells 13 and cells 14 may be employed to provide the contact between cells 13 and cells 14 while at the same time providing preformed passageways for the diffusion of the halogen gas or vapor to the points of contact 24.

In FIG. 3 is shown, by way of illustration, another surface structure which is useful in the cells of the present invention. The particular configuration of FIG. 3 is obtained by taking a plane unit cell such as the unit cell 14 illustrated in FIG. 2 and passing the cell through corrugating rolls in a first direction. This results in a corrugated cell such as illustrated at 13 in FIG. 2. This corrugated cell may then be passed again through corrugating rolls after being turned to any desired angle. In FIG. 3 the cell is formed by passing the plane cell twice through corrugating rolls at angles 90° apart. It is obvious that angles other than 90° may be employed for this purpose. In addition, it should be understood that the surface irregularities of the cells may be formed by other methods. For example, a satisfactory irregular surfaced cell may be obtained by sandblasting or shotpeening the inert metal surface of a cell such as the plane cell 14 of FIG. 2.

In FIG. 1 is shown a battery in which alternate plane cells 14 and irregular surfaced cells 13 are provided. It should be understood that it is not necessary to alternate plane cells with corrugated cells even though this is our preferred embodiment. Alternatively, a plurality of irregular surfaced cells may be employed in contact with each other so long as the resultant assembly provides passageways for the diffusion of halogen gas to the points of contact between the inert metal of one cell and the silver halide electrolyte of the adjacent cell.

The particular halogen atmosphere, the particular silver halide, and the particular inert metal electrode employed in the cells of the present invention may vary within wide limits. For the halogen, we preferably employ bromine or iodine. However, chlorine and fluorine may also be employed. The amount of the particular halogen employed in the practice of the present invention may also vary within extremely wide limits. Since the cells of the present invention are operable at temperatures from below room temperature up to the melting point of the silver halide electrolyte, the amount of halogen employed is generally selected on the basis of the particular halogen employed and on the desired operating temperature of the cell. As a general rule we employ a sufficient amount of the halogen to provide a partial pressure of halogen from about $10^6$ millimeters up to about one atmosphere under operating conditions. With fluorine or chlorine, both of which are gases in the operating range under consideration, the partial pressure of the halogen is obtained by merely charging the halogen gas to the cell under a preselected partial pressure. Since it is most convenient to charge the cells of the present invention under atmospheric pressure, when employing fluorine or chlorine as the halogen, it is convenient to charge the cell with a mixture of the halogen gas and an inert gas such as air or nitrogen, with the total pressure of the charging medium being one atmosphere. However, it should also be understood that the cells of the present invention may be operated with the partial pressure of the halogen being equal to the total pressure in the cell. When employing bromine as the halogen atmosphere, the amount of halogen charged to the cell is determined by the volume of the cell in question. Since bromine is a liquid at room temperature, the liquid bromine may be weighed and then added to the cell. When using iodine as the halogen, the desired amount of iodine, which is a solid at room temperature, may be weighed and placed directly in the cell. Since iodine is a solid or a liquid with a relatively low vapor pressure under the operating conditions of the cells of the present invention, it is usually possible to add a large excess of iodine to the system without fear of causing too high a pressure within the cell at the operating temperature.

The choice of the halogen atmosphere for the cell automatically fixes the composition of silver halide layer 23 in the cells since the silver halide is used which corresponds to the halogen atmosphere in the cell. The preparation of this silver halide layer 23 will be described in more detail hereinafter.

The composition of the inert metal layer 21 of the cells of the present invention can also vary within wide limits, the only requirement of the inert metal 21 is that it not react with the halogen atmosphere under the operating conditions of the cell. The preferred materials of construction of inert metal layer 21 are platinum and tantalum. Among other suitable metals for use in this cell are ruthenium, rhodium, palladium, osmium and irridium. The metals listed above are satisfactory for use with any of the halogen gases. In addition, other metals may be used in particular cells if the metal is inert to the particular halogen atmosphere. For example, nickel is a satisfactory material for inert metal layer 21 in cells employing fluorine as the halogen gas. Nickel is not satisfactory with other halogens since these other halogens react with nickel to form nickel halides. In addition to using pure metals for layer 21, alloys of various metals may be employed. Among the alloys which are satisfactory with all halogens are included, for example, the various commercially available nickel-chromium alloys, the various commercially available iron-nickel-cobalt alloys, iron-nickel-chromium alloys, and the like.

In preparing the cells of the present invention, a bimetal strip is first formed from silver and an inert metal. These bimetals may be formed in any suitable manner and since the methods of preparation of bimetal strips are well known in the art, no detailed discussion of the method of preparation will be given in this application. However, it is well known that one suitable method of preparing bimetal strips is by rolling two metals together under a high pressure. This results in a minor amount of interdiffusion of the atoms of each of the metals at the intersection of the two metals to form a strong bond in the nature of a weld between the two metals and produce a desired bimetal strip. The thickness of the inert metal layer 21 and the silver layer 22 in the bimetal strip is not critical and may vary within wide limits. However, for efficient cell design, it is desired to have each of these layers 21 and 22 as thin as possible. Cells have been constructed employing bimetal strips in which each layer in the bimetal strip has a thickness of ½ to 10 mils. Preferably, however, we employ bimetal strips in which each of the layers is of the order of from 1 mil to 5 mils in thickness. As previously described, the bimetal strips may be employed in plane cells such as shown in cell 14 of FIG. 1 or may be employed in cells such as cell 13 with surface irregularities.

In preparing a cell such as cell 13 or the cell shown in FIG. 3, the bimetal strip has its surface made irregular prior to the addition of the silver halide layer to the bimetal. After obtaining the bimetal strip in its desired form, whether it be plane or irregular, the desired halide layer is then produced. The method of producing halide layer on silver surfaces is well known in the art and, therefore, will not be considered in detail in this application. One very simple method of preparing such a halide layer is to subject the bimetal strip containing silver layer 22 to the action of a halogen vapor at room temperature for a few hours. Higher temperatures can also be employed and in a matter of a few minutes at 150° C. the surface of the silver is converted to silver halide. The thickness of the silver halide layer 23 in the cells of the present invention is not critical, and since the silver halide is not depleted during the operation of the cell, the silver halide layer may be as thin as is consistent with uniform coating. In practice, silver halide layers have been employed with thicknesses of the order of 2–5 microns. It is desirable to maintain the thickness of the silver halide layer in this range since the resistance of the cell increases with the thickness of the halide layer. However, it should be understood that the cells and batteries of this invention are operable when the thicknesses of the various layers of the unit cell vary within extremely wide limits from the thicknesses recited above.

In assembling cells of the present invention one of the terminal electrodes may be assembled at one end of casing 11. The internal diameter of casing 11 and the external diameter of terminals 15 are selected so that a gas-tight seal is obtained between members 11 and 15 on assembly of the two members. For convenience, the internal portion of external electrode 15 is tapered at 25 so as to clear ribs 18 on assembly of the unit and to provide a surface 26 which is perpendicular to the axis of casing 11 and which has a diameter smaller than the diameter between the various ribs 18. External electrodes 15 are in contact with the halogen atmosphere, and therefore should be of a metal which is inert to the action of the halogen. Suitable materials of construction for inert electrodes 15 are the same as the materials of construction for inert metal layers 21 of cells 13 and 14. Inert metal disk 17 is next added to the assembly through the open end of housing 11. The function of disk 17 is to serve as the inert metal electrode for the lowermost unit in the cell and to provide means for conducting current from the lowermost cell to external electrode 15. After inserting disk 17, the desired numbers of alternate cells 13 and 14 are then added to the assembly. The number of unit cells 13 and 14 added to the assembly depends entirely on the desired voltage from the resulting battery, bearing in mind that the cells are in series and the total voltage of the cell is equal to the sum of the voltages of the unit cells. After assembly of the desired number of unit cells, conducting rubber disk 16 is inserted in the assembly. This conducting rubber disk serves the two-fold purpose of providing the resiliency necessary to insure contact between the various battery elements and conducting current from the uppermost cell in the battery to upper inert electrode 15. The cell assembly is completed by adding upper external electrode 15 after insuring that the proper amount of halogen is present in the system. This final operation in the assembly can take place in a number of different ways. For example, when the halogen is fluorine or chlorine, it is convenient to complete the final assembly in an atmosphere containing the desired pressure of fluorine or chlorine. In this manner the battery will be sealed with the desired amount of halogen therein. When the halogen is bromine or iodine, the desired amount of the halogen may be placed in conduit 19 prior to insertion of the second external electrode 15 in the assembly. External electrodes 15 are provided with suitable battery connections such as terminal screws 27.

In preparing the unit cells of the present invention, it should be understood that the bimetal strip is first formed from relatively large sheets of the inert metal and silver and either before or after the formation of the halide layer on the silver surface, the unit cells of the desired cross-sectional area and shape are formed in any suitable manner, such as by cutting the unit cells from the larger sheet or by some mechanical means such as by punching the cells out to form disk-like cells. Where the cells are punched from the bimetal sheets prior to halogenation, the individual unit cells are then subjected to a halogen vapor at an elevated temperature as previously described.

A battery of the present invention was constructed by first forming a bimetal sheet of tantalum and silver. Half of this sheet was then passed through a corrugating mill a first time and then a second time in a direction perpendicular to the direction of the original corrugations. This resulted in a sheet having the general appearance shown in FIG. 3. Disks were then punched from both the plane sheet and the corrugated sheet having diameters of 0.375 inch. These disks were then brominated by placing them in a container of bromine at a temperature of 25° C. for 3 hours. The resulting unit cell assemblies comprised two mils of tantalum, two mils of silver, and three microns of silver bromide. A number of these cells were then assembled to form a structure as shown in FIG. 1 and liquid bromine as added to the assembly in a sufficient amount so that bromine vapors were in equilibrium with liquid bromine, providing a partial pressure of bromine at 25° C. of about 200 millimeters. Each unit cell of this assembly had a voltage of 0.97 volt, which is the theoretical value expected from the chemistry of the system. The battery had a voltage of 200 volts per inch, produced an initial short circuit current of 200 microamps.

Another cell similar to that just described was prepared from a bimetallic strip of platinum foil and silver foil with a 5 micron coating of silver iodide on the silver surface. When a number of these cells were assembled as in FIG. 1 with sufficient iodine added to provide iodine vapor in equilibrium with solid iodine, an iodine pressure of 0.306 millimeters was obtained at 25° C. The voltage generated by each unit cell was 0.67 volt, which is the expected theoretical voltage. This cell was also evaluated at 25° C., at which temperature the partial pressure of iodine was 0.306 millimeter. This cell produced a unit cell voltage of 0.67 volt, which is equal to the theoretical voltage. The short circuit current of this cell at 25° C. was 200 microamperes.

Cells constructed in accordance with the above illustrations employing either platinum or tantalum as the inert electrode with a silver chloride electrolyte provide a unit cell voltage of 1.14 volts, which is the theoretical value, with chlorine at one atmosphere of pressure and 25° C. Similar cells with fluorine as the halogen atmosphere and silver fluoride as the electrolyte produce voltages at 25° C. and one atmosphere of about 2 volts.

In describing the cells of the present invention, emphasis has been placed on the use of pure halogen as the source of the atmosphere in which the cell operates. It should be understood, however, that the halogen atmosphere may be produced by adding to the cell a substance which will generate halogen under the operating conditions. For example, such substance may be incorporated in channels 19 of external electrodes 15. Among the substances which are satisfactory for the generation of halogen may be mentioned, for example, tribromomelamine, N-bromosuccinamide, N-N'-dibromobarbituric acid, halogen impregnated charcoal, cesium tetraiodide, cesium tetrabromide, cesium triiodide, etc. In addition, to employing a single halogen and a single silver halide in the cells of the present invention, it is also possible to add a minor amount of a second halogen or a second halide to the cells. In addition, minor amounts of impurities may be added to the silver anode if desired.

While other modifications of this invention and variations of the structure which may be employed within the scope of the invention have not been described, the invention is intended to include all such as may be embraced within the following claims.

What we claim as new and desire to secure by Letters Patent of the United States is:

1. A solid electrolyte structure suitable for assembly in a battery and adapted to operate in a halogen-containing atmosphere, said structure comprising a unitary bimetallic element composed of an inert metal cathode and a silver anode wherein the silver anode has a silver halide film on its external surface, the bimetallic element surfaces being of an irregular nature defining preformed channels for halogen passage.

2. A solid electrolyte structure suitable for assembly in a battery and adapted to operate in a bromine containing atmosphere, said structure comprising a unitary bimetallic element composed of a tantalum cathode and a silver anode wherein the silver anode has a silver bromide film on its external surface, the bimetallic element surfaces being of an irregular nature defining preformed channels for bromine passage.

3. A solid electrolyte structure suitable for assembly in a battery and adapted to operate in a bromine containing atmosphere, said structure comprising a unitary bimetallic element composed of a platinum cathode and a silver anode wheerin the silver anode has a silver bromide film on its external surface, the bimetallic element surfaces being of an irregular nature defining preformed channels for bromine passage.

4. A solid electrolyte structure suitable for assembly in a battery and adapted to operate in an iodine containing atmosphere, said structure comprising a unitary bimetallic element composed of a tantalum cathode and a silver anode wherein the silver anode has a silver iodide film on its external surface, the bimetallic element surfaces being of an irregular nature defining preformed channels for iodine passage.

5. A solid electrolyte structure suitable for assembly in a battery and adapted to operate in an iodine containing atmosphere, said structure comprising a unitary bimetallic element composed of a platinum cathode and a silver anode wherein the silver anode has a silver iodide film on its external surface, the bimetallic element surfaces being of an irregular nature defining preformed channels for iodine passage.

6. A multiple cell battery adapted to operate in a halogen atmosphere comprising an insulating casing and a plurality of stacked, serially arranged solid electrolyte structures within said casing, at least two of said structures comprising a unitary bimetallic element composed of an inert metal cathode and a silver anode wherein the silver anode has a silver halide film on its external surface, the bimetallic element surfaces being of an irregular nature defining preformed channels for halogen passage.

7. A multiple cell battery adapted to operate in an iodine atmosphere comprising an insulating casing and a plurality of stacked, serially arranged solid electrolyte structures within said casing, at least two of said structures comprising a unitary bimetallic element composed of an inert metal cathode and a silver anode wherein the silver anode has a silver iodide film on its external surface, the bimetallic element surfaces being of an irregular nature defining preformed channels for iodine passage.

8. A multiple cell battery adapted to operate in a bromine atmosphere comprising an insulating casing and a plurality of stacked, serially arranged solid electrolyte structures within said casing, at least two of said structures comprising a unitary bimetallic element composed of an inert metal cathode and a silver anode wherein the silver anode has a silver bromide film on its external surface, the bimetallic element surfaces being of an irregular nature defining preformed channels for bromine passage.

9. A multiple cell battery adapted to operate in a halogen atmosphere comprising an insulating casing and a plurality of stacked, serially arranged solid electrolyte structures within said casing, each of said structures comprising a unitary bimetallic element composed of an inert metal cathode and a silver anode wherein the silver anode has a silver halide film on its external surface, at least two of said structures having its bimetallic element surfaces of an irregular nature defining preformed channels for halogen passage.

10. A multiple cell battery adapted to operate in a halogen atmosphere comprising an insulating casing and a plurality of stacked, serially arranged solid electrolyte structures within said casing, the said structures comprising a unitary bimetallic element composed of an inert metal cathode and a silver anode wherein the silver anode has a silver halide film on its external surface, said structures comprising a first type structure and a second type structure, said first type structure having a plane surface and said second type structure being so constructed that the bimetallic element surfaces thereof are of an irregular nature defining preformed channels for halogen passage, said first type structure and said second type structure being alternately positioned in said casing, whereby diffusion of said halogen-containing atmosphere between said structures is facilitated.

11. A multiple cell battery adapted to operate in an iodine atmosphere comprising an insulating gas-tight casing, an iodine-containing atmosphere in said casing, and a plurality of stacked, serially arranged solid electrolyte structures within said casing, each of said structures comprising a unitary bimetallic element composed of an inert metal cathode and a silver anode wherein the silver anode has a silver halide film on its external surface corresponding to the halogen in said atmosphere, said structures comprising first type structures and second type structures, each of said first type structures having a plane surface and each of said second type structures having irregular surfaces defining preformed channels, said first type structures and second type structures being arranged alternately in said casing whereby diffusion of said iodine atmosphere between said structures is facilitated.

References Cited in the file of this patent

UNITED STATES PATENTS

| | | |
|---|---|---|
| Re. 24,408 | Hack et al. | Dec. 17, 1957 |
| 2,610,985 | Schumacher | Sept. 16, 1952 |
| 2,615,931 | Hatfield | Oct. 28, 1952 |
| 2,631,181 | Ruben | Mar. 10, 1953 |
| 2,778,754 | Shorr | Jan. 22, 1957 |
| 2,793,244 | Van der Grinten | May 21, 1957 |